United States Patent [19]

Alves et al.

[11] Patent Number: 4,462,564
[45] Date of Patent: Jul. 31, 1984

[54] CONVERSION KIT FOR MOUNTING A RADIO SUBSTITUTED FOR ORIGINAL RADIO IN AUTOMOTIVE VEHICLES

[76] Inventors: Roger J. Alves, 2558 E. Lynwood St., Simi Valley, Calif. 93065; Daniel W. Reyes, 10814 Chimineas St., Northridge, Calif. 91324

[21] Appl. No.: 489,245

[22] Filed: Apr. 27, 1983

[51] Int. Cl.³ .............................................. G12B 9/00
[52] U.S. Cl. ................................................ 248/27.1
[58] Field of Search ...................... 248/27.1, 27.3, 56, 248/57, 310, 311.2, 551, 244, 260, 558; 312/245; 206/19; 455/345; 369/10, 11, 12; 361/422

[56] References Cited

U.S. PATENT DOCUMENTS

| | | | |
|---|---|---|---|
| 1,623,274 | 4/1927 | Robinson | 248/260 |
| 3,685,879 | 8/1972 | Tsuji | 248/27.3 |
| 3,710,096 | 1/1973 | McFarlin | 248/244 |
| 4,068,175 | 1/1978 | Maniaci | 455/345 |
| 4,211,976 | 7/1980 | Inoue | 455/345 |
| 4,274,330 | 6/1981 | Witten et al. | 248/27.1 |
| 4,336,673 | 6/1982 | Duchesne et al. | 248/27.1 |
| 4,340,795 | 7/1982 | Arthur | 248/27.3 |
| 4,365,280 | 12/1982 | Crosetti et al. | 248/27.3 |
| 4,372,509 | 2/1983 | Krainhöfer | 248/27.1 |
| 4,378,099 | 3/1983 | Ikeda et al. | 248/27.3 |

Primary Examiner—William H. Schultz
Assistant Examiner—Ramon O. Ramirez
Attorney, Agent, or Firm—Herzig, Schaap & Yanny

[57] ABSTRACT

A conversion kit having the necessary parts for purposes of mounting a radio or similar accessory in the cavity in the dash board of various automobiles. A mounting frame is provided having a front panel to which the radio or other accessory can be attached. The mounting frame is provided with brackets and openings or slots in both sides or the top and the ends whereby brackets can be adjusted into desired positions so that the mounting will accommodate to whatever mounting facilities or mounting holes are available in the cavity so that the mounting frame and mounting panel can accommodate to different cavities with the front panel in a substantially flush position with respect to the trim panel.

13 Claims, 8 Drawing Figures

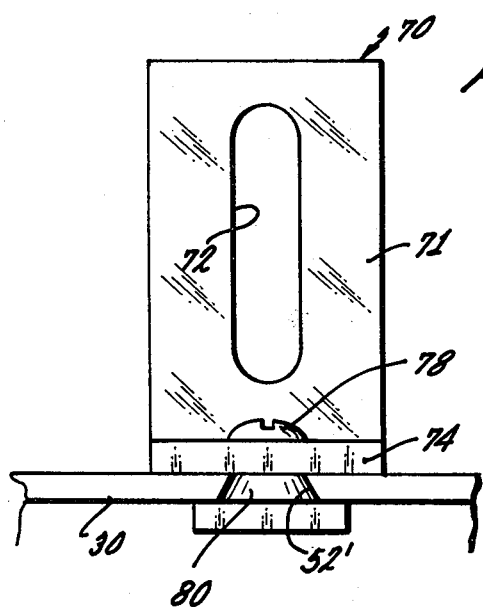
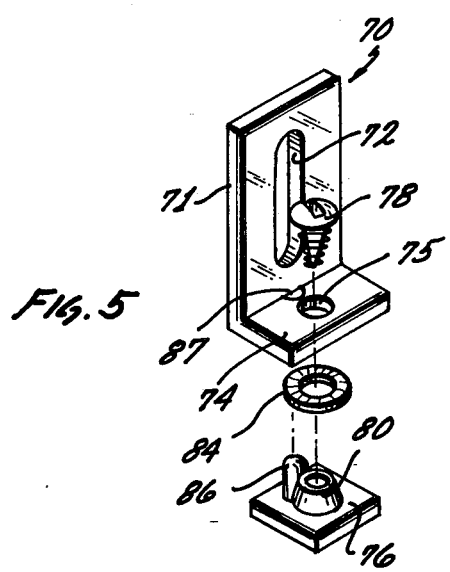
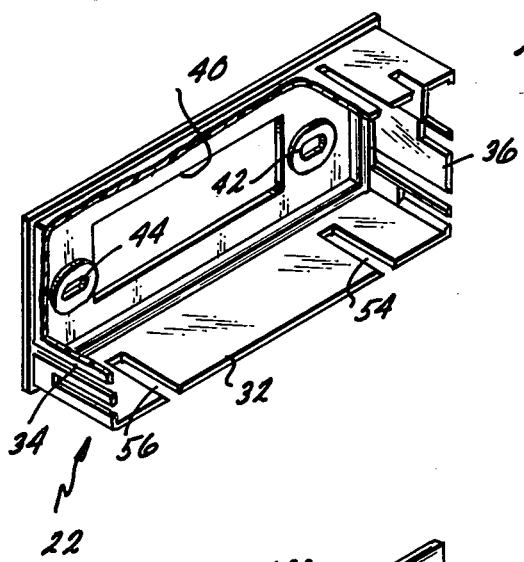
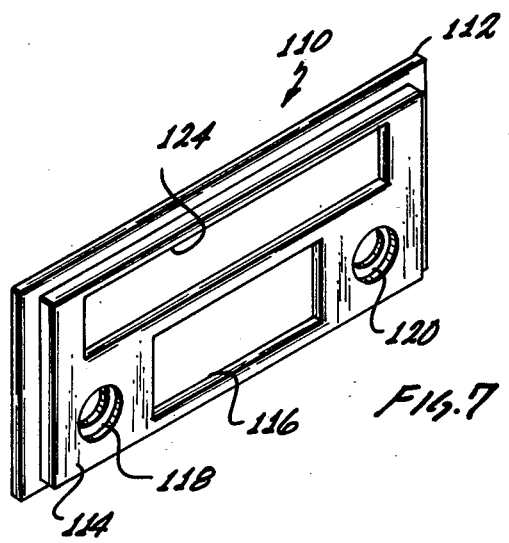
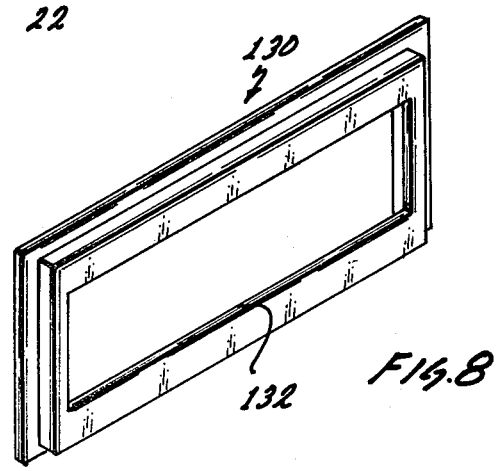

CONVERSION KIT FOR MOUNTING A RADIO SUBSTITUTED FOR ORIGINAL RADIO IN AUTOMOTIVE VEHICLES

BACKGROUND OF THE INVENTION

1. Field of the Invention

The invention relates to an assembly or device in the form of a conversion kit including a frame and necessary parts to facilitate the mounting of a radio, tape player/equalizer in an automobile, which is substituted for the original equipment radio.

2. Description of the Prior Art

It has become quite common in the contemporary automobile market for owners to want to substitute for the original equipment radio, (or dummy panel when the car comes equipped without a radio), that is in the car when new, a radio of a different type. Typically, in original equipment the radio is, of course, mounted or installed in a cavity in the dash of the automobile with a trim frame around the control panel of the radio, which is on the dash of the automobile.

Present day automobiles, of course, all differ in style and appearance including the dash and the size and location of the cavity in which the radio is installed relative to the dash. Conversion kits have been available wherein a frame is supplied that is inserted into the cavity after the radio has been removed to facilitate counting of a different radio. However, relative to the prior art, a large assortment of different conversion kits are necessary in order to fill the requirements of different automobiles having differences as explained above.

Thus, there is a strong need in the art for a conversion kit having the capability of serving its purpose in a large variety of different automobiles. This type of capability or adaptability in the known prior art has not been available. Thus, each different conversion or adaptor assembly that has been available, has been different for different automobiles, not having the desired adaptability as explained herein, such that the one kit would have the capabilities of conversion installation in a wide number or variety of current automobiles, particularly General Motors automobiles with the new General Motors M-2000 series radio chassis.

The herein invention, an exemplary form of which is described in detail herein provides an assembly or kit which fills the need as described in the foregoing and overcomes the difficiencies and drawbacks of the prior art.

SUMMARY OF THE INVENTION

A preferred exemplary form of the invention is shown in the drawings and described in detail hereinafter.

In a preferred form of the invention is in the form of a kit of parts which may be called a conversion kit. The kit includes a frame, the front of which is a radio mounting panel which is insertable into the cavity in the dash of an automobile after the original equipment radio has been removed. (Or in the event no original equipment was provided and the cavity for it is covered by a dummy panel). The frame with a radio mounting panel is designed to have the substitute radio mounted to it. The frame with a radio mounting panel as referred to is preferably generally rectangular, the radio mounting panel on the front being rectangular, the opposite side of the frame being open. The sides and ends have slots in them which are sized and positioned to provide the capability or adaptability of the kit to a number of different automobiles. That is, the mounting parts that are furnished with the radio mounting panel frame provides for mounting the frame at the different depths for individual cavities; for different positioning and spacing of the holding or mounting brackets; and whether the panel is mounted from the ends or top and bottom or both. That is, the mounting parts are constructed to accommodate to different mounting holes in the frame around the entrance to the cavity in the dash for the radio.

The radio mounting panel can be designed to be fabricated by plastic injection molding. Other parts are formed by way of molding a single unit with the parts attached to the unit in a way that they can easily be broken away.

The method of removing the original equipment trim panel and radio, positioning and mounting of the frame with a radio mounting panel; mounting the substitute radio, and repositioning the original trim panel is a simplified one because of the nature of the kit and is therefore adapted to a number of conventionally available automobiles such as the 1981-1983 Buick Century; SkyHawk; the Oldsmobile Firenza; Cadillac Cimarron; Chevrolet Cavalier; Pontiac J-2000; Chevrolet Camaro; Pontiac Firebird; Chevrolet Celebrity; Chevrolet S-10; GMC Truck/Blazer S-15; Oldsmobile Cutlass Cierra; and Pontiac 6000.

In other words the conversion and installation instructions for utilization of the kit to different makes of automobiles can be made very simple.

In the light of the foregoing the primary object of the invention is to provide the users of automotive equipment with a simplified conversion kit enabling an individual to remove the original equipment radio from a vehicle, to install the conversion kit of the herein invention whereby a substitute radio or when no radio was equipped can be readily mounted while preserving the original decorative appearance of the dash of the vehicle.

A further object is to make available a conversion kit as in the foregoing wherein the kit includes a radio mounting panel constructed to be adaptable for mounting in the cavity of the dash where an original equipment radio has been removed or non existed, being constructed to be adapted for mounting at different depths as desired; and to be mounted with different spacings and positions of mounting brackets with the radio mounting panel in a position adapted to facilitate mounting of the new radio, tape player or equalizer into the mounting panel.

A further object is to provide a kit as in the foregoing, wherein the kit includes all necessary mounting brackets and attachment screws, the kit being adapted for mounting of a substitute radio either by means of screws and nuts or by way of protruding shafts extending from the radio.

BRIEF DESCRIPTION OF THE DRAWINGS

FIG. 4 is a detail view taken along the line 4—4 of FIG. 2;

FIG. 5 is a detail isometric view of a clamp and the screw holding device for the clamp;

FIG. 6 is a rear isometric view of the form of the invention shown in FIG. 1;

FIG. 7 is an isometric view of another form of mounting panel having different openings in it;

FIG. 8 is an isometric view of another form of mounting panel having a single rectangular opening in it.

DESCRIPTION OF PREFERRED EMBODIMENTS OF THE INVENTION AND BEST MODE OF PRACTICE

Attention is called to FIGS. 1 through 6 which illustrate in detail one form of the invention.

Figure 2:
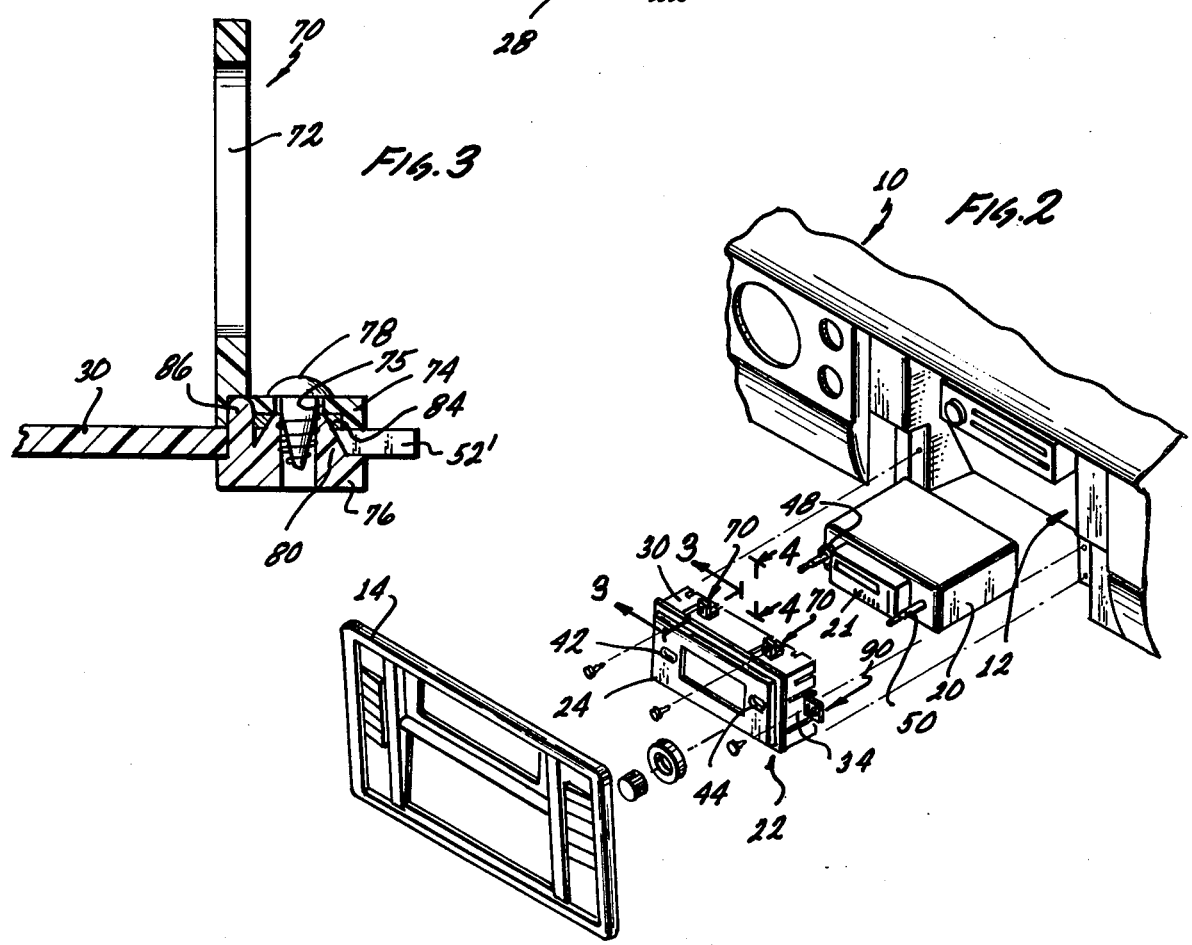
FIG. 2 is an isometric exploded view illustrating the dash of an automobile; a radio to be mounted; the mounting frame unit; and the original trim panel that fits around the cavity in the dash.

Reference should be had to the exploded view of FIG. 2, which illustrates the parts involved in the invention and their relationship.

Numeral 10 illustrates a part of the dash board which might be the dash board of any one of the automobiles or vehicles identified in the foregoing. Numeral 12 identifies the cavity in the dash board which is normally occupied by the radio. Numeral 14 designates the trim panel which fits over the cavity 12 in the dash board when the radio is in position. Numeral 20 designates a radio which may be any particular commercially available radio by way of example. One aspect of the invention is that the owner of the vehicle can remove the original equipment radio from the dash board and substitute some other radio as represented the numeral 20.

Numeral 22 designates, generally, the part of the conversion kit that can be called the mounting frame or adaptor frame. The mounting frame has a front mounting panel as designated at 24. The mounting frame or adaptor designated by the numeral 22 is illustrated in the isometric view of FIG. 1. FIG. 6 is a rear isometric view of the mounting unit 22.

The mounting frame 22 may be made of plastic by an injection molding process although it, of course, can be made of other materials and other processes. In the exemplary form shown, there is a rectangular panel 28 and extending rearwardly from it are a top member 30 and a bottom member 32 and end members 34 and 36. The top and bottom members 30 and 32 can, of course, also be referred to as side members, the members 34 and 36 being the ends of the retangular configuration all of which are integral with the panel 28.

The front panel 24 is integral with the panel 28 having slightly smaller dimensions as shown, so that its edges are spaced slightly from the top, bottom and end edges of the panel 28. The panel 24 is a front panel and preferably it has a textured surface so as to be decorative in appearance. The panel 24 might extend or protrude one-fourth (¼ inch) from panel 28 or farther such as a full inch for accommodating different depth cavities or sizes of radios.

Figure 1:
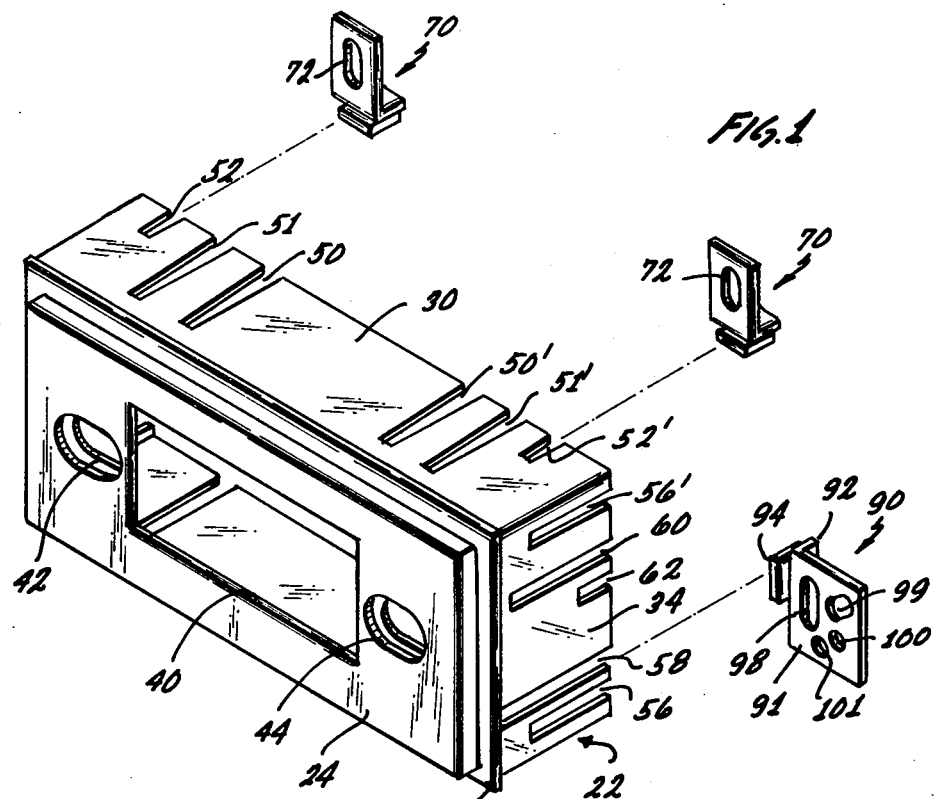
FIG. 1 of the drawings is an isometric view of one form of a mounting frame unit showing brackets which are attachable to the top and a bracket which is attachable to the end of the unit.
Figure 3:
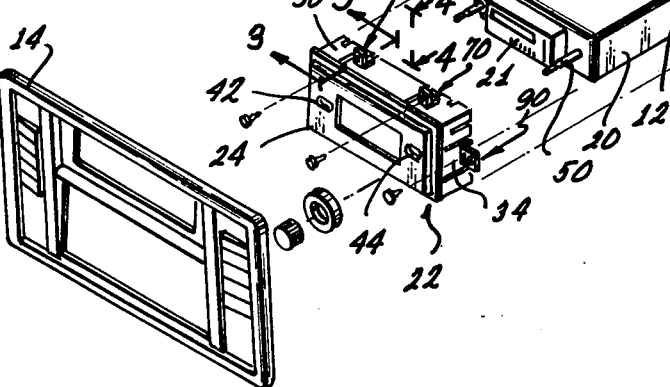
FIG. 3 is a detail cross-sectional view taken along the line 3—3 of FIG. 2.

In the form of the invention shown in FIG. 1 the front panel or panels have a rectangular opening 40 which is of a size to have a part of a radio extend through it as illustrated in FIG. 2, the extending front part being designated at 21. The front panel or panels 24 and 28 have elongated or oval holes or openings 42 and 44 which in the assembled condition have operating stems 48 and 50 of the radio 20 extending through them as can be observed from the exploded view of FIG. 2. These holes are mounting holes.

The side or top 30 of the mounting frame 22 has in it a plurality of slots in two groups as shown. The first group is identified by the numerals 50, 51, and 52. The second group which is near the other end of the frame unit are identified by the numerals 52', 51' and 50'. The two groups are in symmetrical relationship with respect to the frame unit 22 and to each other. The openings or slots 50 and 51 are of the same length or depth and the slot 52 is shorter or of less depth. The other side or, that is, the bottom of the unit 20 has in it two similar openings or slots as designated at 54 and 56 which are spaced from the ends of the frame unit 22. The purposes of the openings or slots will be explained presently.

The end 34 has two groups of openings or slots in it also. Near the bottom the end 34 has an opening or a slot 56 in it there being a corresponding symmetrical slot 56' in the end 34 near the top of it. Adjacent to the slot 56 is a parallel, but longer slot 58. This slot extends all the way to the panel 28. Adjacent to the slot 56' is a slot 60 which is parallel to it and is longer. Adjacent to the slot 60 is a slot 62 which is parallel to it and spaced from it. The slots as described are in relative positions as shown.

The opposite end 36 of the unit 22 has slots in it corresponding exactly to the slots in the end panel 34. The frame unit 22 with the front panel is made of a size so as to be readily capable of being inserted into the cavity 12 in any of the vehicles identified representively in the foregoing and this could, of course, include other vehicles as well as having a similar cavity in the dash.

The frame unit 22 is constructed so that it can be inserted into the desired or appropriate depth in any of the cavities as referred to, so that the kit has the adaptability or capability with respect to all of the vehicles identified in the foregoing as well as others.

As may be observed from FIG. 2 the mounting plate 24 serves as the mounting plate for the radio that is in the cavity, the stems 48 and 50 extending through the holes 42 and 44 in assembled relationship of the parts of the kit. After mounting of the frame unit 22 and the mounting of the radio the original trim panel 14 is put back into position around the periphery of the cavity 12. The construction of the unit 22 including the slots and brackets that are provided, as will be explained, provide the conversion kit with the adaptability and capability to be used in different cavities, at different depths with the securement means including the brackets providing for accommodation to different positions of mounting holes having reference to the cavity and parts of the cavity as will be explained more in detail presently.

Numerals 70 represent bracket units which can be cooperate with the slots in the unit 22 in such a manner that these bracket units accommodate to the screw holes or otherwise associated with the particular cavity, in which unit 22 is to be installed.

One of the brackets as shown in detail in FIG. 5, has a right angle member having an upright part 71 with an elongated slot 72 and a horizontal foot part 74 having a screw hole 75 in it. The bracket 70 is attachable to a base part 76 by means of a screw element 78 which goes through the hole 75. The base part 76 has a conical boss 80 to receive the screw 78. The bracket assembly as described can be secured to the unit 22 at any position along one of the slots, for example, the slots in the top member 30. Numeral 84 designates a washer that fits over the boss 80 between the foot part 74 and the base 76 as may be seen in FIG. 3. The base 76 has an upstanding pin 86 which goes through a hole 87 in the foot portion 74 to prevent the base portion 76 from turning relative to the foot portion 74. As stated the bracket assembly can be secured to one of the slots such as the slots in the top 30 at any position along the length of the slot, the same being true as to the bottom 32 and also the ends 34 and 36. Details of the bracket assembly are shown in the cross-sectional view FIG. 3 and FIG. 4.

Numeral 90 designates another form of bracket which may be used particularly for supporting the unit 22 from the ends. This bracket has a flat portion 91 and horizontally extending foot 92. Numeral 94 designates a base like the base 76, previously described, this bracket assembly being otherwise similar to the bracket already described, that is, the parts are attached by a screw in the same manner.

The part 91 of the bracket 90 has an elongated slot 98 in it, an elongated hole 99, and round holes 100 and 101 positioned so as to be able to readily accommodate positioning it relative to screw or attachment holes around the border of the cavity of the dash.

FIG. 2 illustrates the manner in which the bracket assemblies as described are used for mounting one of the frame units 22 in a cavity in a manner whereby the radio 20 can be mounted from the mounting frame 24.

The unit 22 can be mounted in the cavity using top brackets as shown in FIG. 2 and/or bottom brackets as well or on the other hand using the end brackets, such as the brackets 90, also illustrated in FIG. 2.

In mounting the unit 22, depending upon the particular dash cavity of the automobile it may be appropriate to mount the unit 22 either by way of the top brackets as shown at 70 or on the other hand by way of the end brackets depending upon the mounting facilities that are present by way of which the original radio may have been held. Where mounting holes are available for top brackets such as 70, the brackets 70 are mounted on the unit 22 by utilization of slots to provide the correct spacing of the brackets and positioning them in the slots to a position so that the mounting unit is positioned at the appropriate depth in the cavity. The brackets 70 are then attached in the cavity by way of screws or bolts to the appropriate mounting holes in the cavity as referred to, utilizing slots 72 in the brackets.

After brackets 70 have been secured in the appropriate position the radio, such as the radio 20, is mounted to the front panel 24 by the stems 48 and 50 extending through the mounting holes 42 and 44. The mounting unit 20 and the radio are then mounted in the cavity with the bracket 70 attached by screws or bolts to the holes provided for mounting in the cavity.

After the assembly is thus mounted in position and at the correct depth the original trim panel 14 is replaced over the cavity in a position it originally occupied.

On the other hand, if it appears that it is more appropriate or convenient to mount the unit 22 from the ends again the original radio is removed and it is ascertained from its mountng the correct positioning of the end brackets such as the bracket 90 which are then attached in appropriate position to the end panels 34 and 36 so that mounting holes in the part 91 of brackets like the bracket 90 will line up with mounting holes provided in the border or perimeter of the cavity in the dash or otherwise as illustrated by the dotted lines in FIG. 2. Again, after the radio has been mounted to the unit 22 this assembly is mounted in the cavity and the trim panel 14 then replaced in its original position.

The invention provides for construction of the mounting frame or unit 22 in slightly different forms in order to accommodate to different radios or different types of units or assemblies to be held in the cavity.

FIG. 7 shows another form of mounting panel, the panel in FIG. 7 being identified by the numeral 110. It includes a flat rectangular panel 112 with an integral panel 114 having slightly smaller dimensions, like the panel 24. This panel has a rectangular opening 116 in it and mounting holes 118 and 120. The opening 116 is for a radio. This panel has another elongated opening 124 which is above the opening 116. The opening 124 will accommodate a radio having another unit attached to it which may be an equalizer having a front panel of a size to fit into the opening 124. In other respects the mounting frame used with panel 110 is like the one already described and the procedure for mounting in the cavity is the same.

FIG. 8 shows another form of mounting panel, which is identified by the numeral 120 which has only a single rectangular opening 132 in it for the radio. Both the panels 110 and 130 preferably are made as an integral part of a mounting unit like the unit 22 of FIG. 1. Similar procedures and techniques are used for mounting the radio to the panel and securing the mounting unit such as 22 in the cavity.

While the foregoing disclosure is illustrative of the conversion kit as constructed and applied to mounting of a radio in a cavity of a vehicle it should be understood that the kit and its application has equal utility with respect to other articles as pointed out in the foregoing, such as a stereo unit; a radio with an equalizer as an integral part; or other comparable devices or units.

From the foregoing those skilled in the art will readily understand the nature of the invention, its construction, the manner of its utilization and the manner in which all of objectives as stated in the foregoing are realized.

The foregoing disclosure is representative of exemplary forms of the invention and is to be interpreted in an illustrative rather than a limiting sense and is to be accorded the full scope of the claims appended hereto. Thus, it is to be seen that the concept and its implementations is common to cavities in a dash board in all of the particular vehicles referred to. The significance of the concept and its implementation resides in the adaptability and capability of the mounting unit to be mounted in different cavities with variations in the positions of the securement means with respect to all of the vehicles and to different radios or the like that may be mounted to the mounting panel. Thus, it is to be understood that the scope of the invention extends to variations that may be made in the configuration of the mounting frame itself; the exact forms of securement devices utilized; and the exact positioning of the securement devices.

What is claimed:

1. A conversion kit for mounting an accessory such as a radio, in a cavity defined by a dash structure of a vehicle, the kit comprising:
    (a) a frame unit having a front mounting panel, the front mounting panel defining at least one opening to receive at least a part of the accessory, the frame unit also having top, bottom, and end members extending rearwardly from the mounting panel, at least one of the members defining a plurality of rearwardly extending slots; and,
    (b) at least one mounting bracket having a first portion with means to attach the bracket to any one of the rearwardly extending slots at any position along the length of the slot, and a second portion attachable to the dash structure of the vehicle so as to retain the frame unit in the cavity.

2. The conversion kit as set forth in claim 1 wherein the top member defines the plurality of rearwardly extending slots.

3. The conversion kit as set forth in claim 2 wherein the top member defines a plurality of groups of rearwardly extending slots, each group having several slots of differing lengths.

4. The conversion kit as set forth in claim 16 wherein each group comprises three slots.

5. The conversion kit as set forth in claim 2 wherein the end members also define a plurality of rearwardly extending slots.

6. The conversion kit as set forth in claim 5 wherein each end member defines a plurality of groups of rearwardly extending slots, each group having several slots of differing length.

7. The conversion kit as set forth in claim 6 wherein the bottom member defines a purality of rearwardly extending slots.

8. The conversion kit as set forth in claim 1 wherein the front mounting panel defines a single opening of rectangular shape.

9. The conversion kit as set forth in claim 1 wherein the front mounting panel defines a rectangular opening and a pair of oval-shaped openings, one oval-shaped opening being located on either side of the retangular opening.

10. The conversion kit as set forth in claim 1 wherein the front mounting panel defines two rectangular openings, one disposed above the other, and a pair of circular openings, the circular openings being located on either side of one of the rectangular openings.

11. The conversion kit as set forth in claim 1 wherein the first portion of the mounting bracket comprises a generally horizontal foot part defining a screw opening and a base part having a boss thereon attached to the foot part via screw means such that the boss passes through the slot in which the mounting bracket is located.

12. The conversion kit as set forth in claim 11 wherein the second portion of the mounting bracket comprises an upright part extending from the foot part, the upright part defining at least one screw opening.

13. The conversion kit as set forth in claim 11 wherein the second portion of the mounting bracket includes an upright part extending from the foot part, the upright part defining an elongated screw opening allowing a screw to be attached to the dash at any position within the elongated opening.

* * * * *